Aug. 12, 1924. 1,504,761
H. HUBBELL
CLASP
Filed May 31, 1923
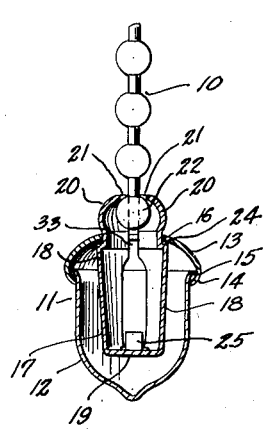
Fig. 1.
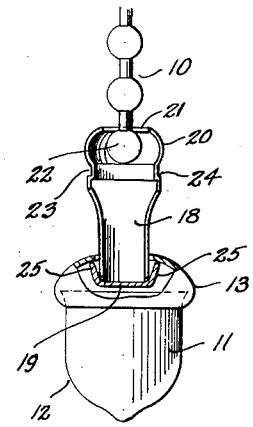
Fig. 2.
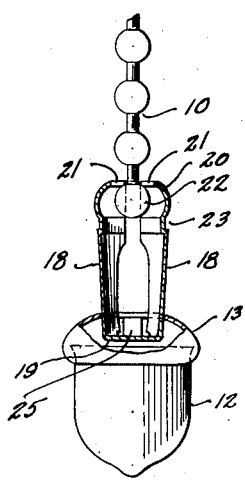
Fig. 3.
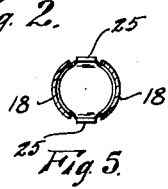
Fig. 4. Fig. 5.
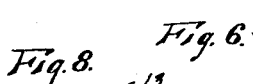
Fig. 6.
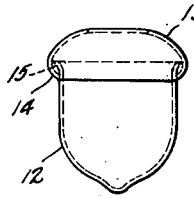
Fig. 8.
Fig. 9.
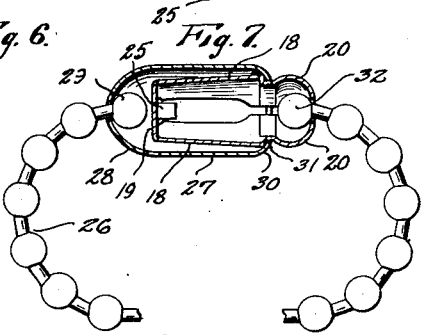
Fig. 10.
INVENTOR
Harvey Hubbell
BY
Wooster & Davis
ATTORNEYS.

Patented Aug. 12, 1924.

1,504,761

UNITED STATES PATENT OFFICE.

HARVEY HUBBELL, OF BRIDGEPORT, CONNECTICUT.

CLASP.

Application filed May 31, 1923. Serial No. 642,502.

*To all whom it may concern:*

Be it known that I, HARVEY HUBBELL, a citizen of the United States, residing at Bridgeport, county of Fairfield, State of Connecticut, have invented a new and useful Clasp, of which the following is a specification.

This invention relates to a clasp or securing means adapted for use in attaching pendents or terminals to pull socket chains and the like, for key rings, necklaces, and so forth, and has for an object to provide a device of this character which will be simple in construction, will securely fasten the separable articles together, and may be quickly and easily applied or detached.

With these and other objects in view I have devised the improved clasp or securing means, two embodiments of which are illustrated in the accompanying drawing, in which—

Fig. 1 is a longitudinal section through an acorn forming a pendent or terminal for a pull socket, showing the application of my improved securing means applied thereto, and with the elements in the position they occupy when in securing position.

Fig. 2 is a partial side elevation and partial sectional view of the device shown in Fig. 1 taken at right angles to Fig. 1 and showing the elements extended to allow disconnection from the chain.

Fig. 3 is a view similar to Fig. 2 taken at right angles to Fig. 2.

Fig. 4 is a top plan view of the strip.

Fig. 5 is a transverse section thereof substantially on line 5—5 of Fig. 7.

Fig. 6 is a side elevation of the clip.

Fig. 7 is a side elevation of the clip substantially at right angles to Fig. 6.

Fig. 8 is a top plan view of the body or acorn in Figs. 1, 2 and 3.

Fig. 9 is a side elevation thereof, and

Fig. 10 shows a longitudinal section of a clasp as modified for use with a key ring, necklace or the like.

Referring to Figs. 1 to 9, at 10 is indicated a flexible ball chain such as is used for operating the switches of electric pull sockets, and in these figures I have shown my clasp as used for attaching a pendant, ball or acorn to the lower end of this chain, but I wish it to be distinctly understood that this clasp or securing means is not limited to use with this type of device, but is adapted for use in numerous other devices.

In these figures the pendant comprises a body member 11, in this particular form having two sections 12 and 13 secured together by means of a flange 14 on the upper member rolled over the outwardly extending flange 15 on the lower member, the two members, when together, forming the general outline of an acorn. In the top of the upper member is an opening 16 in which the clip 17 is slidably mounted. This clip is preferably formed from a piece of sheet metal and is also preferably resilient, and comprises two spaced longitudinally extending side members 18 rounded so that in cross section the clip is generally circular, as shown in Figs. 4 and 5. These side members are integrally secured together at their inner ends by the portion 19, but at their outer ends are disconnected so that they may have movement toward and from each other. At their outer ends they are preferably substantially spherical, as shown at 20, curving inwardly at their extreme ends to provide flanges provided with opposed recesses 21 forming an opening for passage of the end ball or enlargement 22 of the chain 10. At the base of the spherical portion 20 is a groove 23 extending around the clip for entrance of the sides of the opening 16 in the body member, and to provide a shoulder 24 adapted to engage the inner wall of the body around this opening. At its inner end the clip is provided with resilient lugs or fingers 25 extending from the connecting portion 19 between the side members, and the free ends of these lugs extend outwardly beyond the surface of the side members.

In applying the clip to the body member its inner end is forced through the opening 16, the fingers or lugs 25 yielding inwardly to allow the end of the clip to pass through the opening. After the lugs or fingers 25 have passed through the opening their free ends spring outwardly, as shown in Fig. 2, so as to engage the inner wall of the body when the clip is extended and prevent removal of the clip from the body. The free ends of the side members 18 tend to separate when the clip is made of resilient material substantially as shown in Fig. 3 when the clip is extended, so that the opposite outer walls of the clip are tapered, and these ends are allowed to separate sufficiently to allow the ball or enlargement 22 of the chain to pass through the opening formed by the recesses 21. After this ball or enlargement has been placed in the outer end of the clip, as shown in Figs. 2 and 3, the clip is forced into the body member to the position shown in Fig. 1 with the sides of the opening 16 in the groove 23. The act of forcing this clip into the body member causes the sides of the opening 16 to coact with the tapered side walls of the members 18 and force the outer ends thereof together and engage the opposite sides of the ball or enlargement 22, making the opening formed by the recess so small that this ball or enlargement cannot pass through it. The pendant is now securely fastened to the chain, and it will be apparent that when placed under strain the reaction of the curved walls of the ball or enlargement and the inturned portion of the spherical end of the side members will tend to separate the free ends of these side members and will more securely press the bottom of the groove 23 against the edges of openings 16. Thus the shoulder 24 will more securely hold the elements and they will be locked together. In other words the greater the strain on the elements the more securely will they be locked together. If it is desired to disconnect the chain from the terminal or pendant element, all that is necessary is to press the free ends of the side members 18 together by gripping the spherical portions 20 thereof so as to remove the shoulder 24 from engagement with the body member, the space 33 between the edges of the side members 18 permitting this movement, and then withdraw the clip 17 to the position shown in Figs. 2 and 3. The free ends will then have separated sufficiently to allow the ball or enlargement 22 to pass through the opening formed by the recesses 21. It will thus be apparent that the connection or disconnection of the elements may be quickly and easily made, and when connected they are securely locked together.

In Fig. 10 I have illustrated how the clasp may be used for a key ring, necklace, or the like. In this case the key ring 26 comprises a flexible ball chain, but it may be of any suitable type of chain or other construction, and the body portion 27 of the clasp is in one piece and substantially cylindrical in cross section. At one end it is rolled over, as shown at 28, to embrace an end ball or enlargement 29 of the chain to form a permanent connection therewith, but at its other end is curved inwardly, as shown at 30, and is provided with an opening 31 for passage of the clip 17. In this case the clip is exactly the same as that shown in Figs. 1 to 7, and embraces the ball or enlargement 32 at the other end of the chain in the same manner as described above in connection with Figs. 1 to 9. This end of the chain may also be disconnected from the clip in the same manner as described above.

The simplest and preferred construction is to make the clip of resilient metal, so that when it is withdrawn to the position shown in Figs. 2 and 3 the free ends of the side members 18 tend to separate and allow removal of the ball or enlargement 22 from engagement therewith, but it will be obvious a separate spring may be placed between these members to separate their free ends if desired.

In both of the specific embodiments illustrated the clasp is shown as used with a ball chain, but it will be obvious it may be used with almost any construction so long as there is means on the separate element which may be gripped by the outer ends of the side members when the side members of the clip are moved inwardly under the action of the side walls of opening 16 thereon. Preferably an enlargement, corresponding to the enlargements 22 and 32 is used, which is greater than the opening formed by recesses 21 when the clasp is closed, or with the clip in its innermost position shown in Figs. 1 and 10, but which is small enough to pass through the opening formed by recesses 21 when the clasp is open or the clip withdrawn to its outer position, as shown in Figs. 2 and 3. This enlargement is preferably a ball as shown, or a portion of a ball, but it obviously may be formed in numerous other ways, as for example, by forming a groove in an element for entrance of the flanges provided with recesses 21.

Having thus set forth the nature of my invention, what I claim is:

1. In combination, a body member provided with an opening therein, and a spring clip extending through said opening provided with spaced side members connected together at their inner ends only, said side members being curved over toward each other at their outer ends to provide flanges having opposed recesses forming an opening for insertion and removal of an enlargement on a separate element, the sides of the opening in the body member being adapted to engage the side members of the clip intermediate its ends to retain the enlargement therein.

2. In combination, a body member having an opening, a clip slidable in said opening and provided with means to engage an element to connect the body member thereto, said body and clip arranged to coact when given relative movement in one direction to engage and retain said element, and when given relative movement in the opposite direction to release said element, and means within the body member to prevent removal of the clip from the body member.

3. In combination, a body member provided with an opening, a clip of resilient sheet metal mounted to slide in said opening and comprising a pair of spaced members connected at one end and having substantially hemispherical portions at their outer ends providing inturned flanges adapted to engage an enlargement on a separate element, said flanges being provided with opposed recesses forming an opening for passage of said enlargement, said clip being provided with a circumferential groove adjacent the base of said hemispherical portions to receive the sides of the body opening to retain the clip in engagement with the enlargement.

4. In combination, a body provided with an opening, a resilient clip slidable in said opening and comprising spaced side members connected at their inner ends and having means to retain a separate element, said members being adapted to be held in retaining position by the walls of the body opening, and one or more resilient lugs at the inner end of the clip adapted to move inwardly to allow insertion of the clip in the body opening and then to spring outwardly and engage the inner walls of the body to prevent removal of the clip.

5. In combination, a body provided with an opening, a resilient clip slidable in said opening and comprising spaced side members connected at their inner ends and having inturned flanges at their outer ends to retain an enlargement on a separate element, said clip being provided with a circumferential groove adjacent its outer end to receive the sides of the body opening to retain the clip in engagement with the enlargement, and one or more resilient lugs at the inner end of the clip adapted to move inwardly to allow insertion of the clip in the body opening and then spring outwardly and engage the inner walls of the body to prevent removal of the clip.

6. In combination, a body member provided with an opening therein, a sheet metal spring clip movable in said opening provided with spaced side members connected together at their inner ends, said side members being curved over toward each other at their outer ends to provide flanges having opposed recesses forming an opening, a flexible element, and a ball carried by said flexible element and adapted for insertion in said opening in the clip, the sides of the opening in the body member being adapted to so position the side members of the clip as to retain the ball therein.

7. In combination a body provided with an opening, a clip of resilient sheet metal mounted for longitudinal movement in said opening and comprising a pair of spaced side members connected at their inner ends and having substantially hemispherical portions at their outer ends providing inturned flanges, a flexible element, and a ball carried by said flexible element, said flanges being provided with opposed recesses forming an opening for passage of said ball and adapted to retain said ball, said clip being provided with a circumferential groove adjacent said hemispherical portions adapted to receive the sides of the body opening to hold the flanges in position to retain the ball.

8. In combination, a body provided with an opening, a resilient clip mounted for longitudinal movement in said opening and comprising spaced side members connected at their inner ends and having inturned flanges at their outer ends, a flexible element, a ball carried by said flexible element, said flanges being provided with opposed recesses forming an opening for passage of said ball when the clip is extended, said clip being provided with a circumferential groove adjacent its outer end adapted when the clip is in its inner position to receive the sides of the body opening and hold the flanges in position to retain the ball in the clip, and one or more resilient lugs at the inner end of the clip adapted to move inwardly to allow insertion of the clip in the body opening and then spring outwardly to prevent removal of the clip from the body member.

9. In combination, a body member having an opening, and a clip mounted for longitudinal sliding movement in said opening and having a substantially spherical hollow head outside said body member, said clip comprising a plurality of side members secured together at their inner ends and disconnected at their outer ends so that they may have movement toward and from each other, said head being provided at its outer end with an opening of less diameter than the intermediate portion of said head and adapted for passage of an enlargement on a separate element when said clip is in extended position, said clip being also provided with a circumferential groove adjacent said head adapted to receive the edge of the opening in the body member to hold the side members in position to retain the enlargement in said head when the clip is in its inner position.

In testimony whereof I affix my signature.

HARVEY HUBBELL.